US012474662B2

(12) United States Patent
Cohen et al.

(10) Patent No.: US 12,474,662 B2
(45) Date of Patent: Nov. 18, 2025

(54) PHOTOCONDUCTIVE DRUM SUPPORTS

(71) Applicant: Hewlett-Packard Development Company, L.P., Spring, TX (US)

(72) Inventors: Lavi Cohen, Ness Ziona (IL); Sergey Guralnik, Ness Ziona (IL); Israel Katz, Ness Ziona (IL); Shimi Nakash, Ness Ziona (IL); Assaf Barel, Ness Ziona (IL); Avi Barazani, Ness Ziona (IL)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 18/705,382

(22) PCT Filed: Oct. 28, 2021

(86) PCT No.: PCT/US2021/057092
§ 371 (c)(1),
(2) Date: Apr. 26, 2024

(87) PCT Pub. No.: WO2023/075780
PCT Pub. Date: May 4, 2023

(65) Prior Publication Data

US 2025/0004413 A1 Jan. 2, 2025

(51) Int. Cl.
*G03G 15/00* (2006.01)
*G03G 21/16* (2006.01)

(52) U.S. Cl.
CPC ....... *G03G 15/751* (2013.01); *G03G 21/1671* (2013.01); *G03G 2215/1619* (2013.01)

(58) Field of Classification Search
CPC ............ G03G 15/751; G03G 21/1671; G03G 2215/1619
See application file for complete search history.

(56) References Cited

U.S. PATENT DOCUMENTS

| | | | | |
|---|---|---|---|---|
| 5,999,771 | A | 12/1999 | Wakihara | |
| 6,556,796 | B1 * | 4/2003 | Chavez ............. | G03G 21/1671 399/117 |
| 2002/0106213 | A1 | 8/2002 | Higeta et al. | |
| 2005/0201777 | A1 | 9/2005 | Konishi | |
| 2008/0199213 | A1 | 8/2008 | Saito et al. | |
| 2010/0221041 | A1 | 9/2010 | Takai et al. | |

FOREIGN PATENT DOCUMENTS

| | | | |
|---|---|---|---|
| DE | 4443764 | A1 | 6/1995 |
| RU | 2743634 | C1 | 2/2021 |

* cited by examiner

*Primary Examiner* — Sophia S Chen
(74) *Attorney, Agent, or Firm* — Jordan IP Law, LLC

(57) ABSTRACT

According to an example, a photoconductive drum support comprises a receiving body to receive a photoconductive drum, a rear cup coupled to a first end of the receiving body, a locking member rotatably coupled to a projecting portion of the receiving body, and a front cup positioned to contact a second end of the receiving body. The locking member is movable between an unlocked position in which the front cup is movable along the projecting portion and a locked position in which the locking member is positioned to fix the front cup and the rear cup at a predetermined distance.

14 Claims, 6 Drawing Sheets

500

600

PHOTOCONDUCTIVE DRUM SUPPORTS

BACKGROUND

Liquid electro-photography (LEP) printing systems form images on substrates by transferring printing fluid profiles to the substrates. To obtain the printing fluid profile, a photoconductive element having an electrical charge is selectively discharged. Subsequently, printing fluids are selectively transferred to the surface of the photoconductive element. In some examples, the photoconductive element may be in the form of a photoconductive drum rotatable about a shaft.

BRIEF DESCRIPTION OF DRAWINGS

Features of the present disclosure are illustrated by way of example and are not limited in the following figure(s), in which like numerals indicate like elements, in which.

DETAILED DESCRIPTION

Figure 1A:
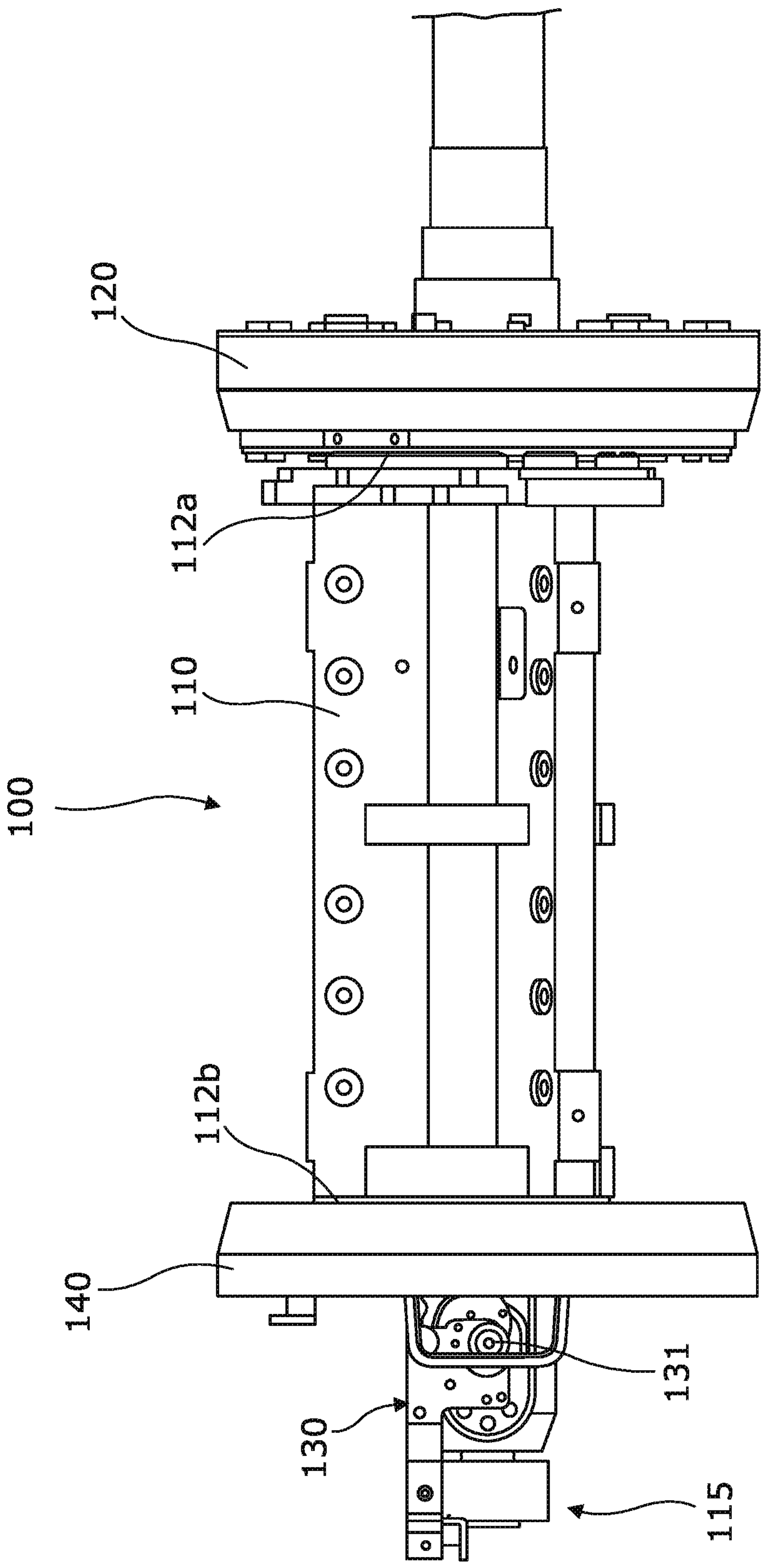
FIG. 1A shows a schematic drawing illustrating a side view of a photoconductive drum support having a locking member in an unlocked position, according to an example of the present disclosure.

For simplicity and illustrative purposes, the present disclosure is described by referring mainly to examples. In the following description, numerous specific details are set forth in order to provide a thorough understanding of the present disclosure. It will be readily apparent, however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

Liquid electro-photography (LEP) printing systems are used to generate images by transferring a printing fluid profile associated with the image to a substrate. To generate the printing fluid profile, a surface of the photoconductive element is electrically charged, selectively discharged, and then, printing fluids are selectively transferred to the surface of the photoconductive element via printing fluid developers such as binary ink developers.

Liquid electro-photography (LEP) printing systems comprise charging elements such as charging rollers to electrically charge a surface of the photoconductive element. In an example, a charging roller uniformly charges a surface of a photoconductive element of an LEP printing system at a reference voltage. In addition to the charging elements, the LEP printing system may comprise a discharging element such as a writing head to selectively discharge specific regions of the surface of the photoconductive element. Afterward, a binary ink developer of the LEP printing system such as a developing unit develops electrically charged printing fluid. Then, the printing fluid is transferred from the developing unit to a region of the photoconductive element based on an electrical charge difference between the region and the electrical charge of the printing fluid. If the electrical charge difference exceeds a charge value, the printing fluid is repelled from such charged regions. By subsequently engaging and disengaging other developing units of the LEP printing system, the printing fluid profile associated with the image is obtained on the surface of the photoconductive element. Then, once the printing fluid profile is ready, the printing fluid profile is transferred to the substrate or any other intermediate elements belonging to the printing system.

As used herein, "printing fluid" refers generally to any substance that can be applied upon a substrate by a printing system during a printing operation, including but not limited to inks, electro-inks, primers, and overcoat materials (such as a varnish), water, and solvents other than water.

When using charging elements such as charging rollers for charging operations and discharging elements such as writing heads for discharging operations, the charging and discharging elements may be positioned at a distance from the photoconductive element. To effectively charge a region of the photoconductive element, the charging element may be set at a first predetermined distance from the photoconductive element. Similarly, to effectively discharge a region of the photoconductive element, the discharging element may be set at a second predetermined distance from the photoconductive element. In an example, the charging elements and the discharging elements may be movable, wherein the movement may be performed in accordance with the type of operation to be performed by the printing system.

In some examples, each of the first predetermined distance and the second predetermined distance may be a distance within a range from 2 to 35 mm during a non-printing operation (such as a maintenance operation) and within a range from 0 to 3 mm during a printing operation. However, in other examples, alternative ranges may be possible.

As explained above, printing fluid may be selectively transferred to a surface of a photoconductive element using binary ink developers such as developing units. In some examples, a developing unit may be movable between an engaged position in which the developing unit is moved towards the photoconductive element and a disengaged position in which the developing unit is moved away from the photoconductive element. In particular, in the engaged position, the developing unit may be at a transfer distance with respect to the photoconductive element. In some examples, the developing unit may contact the photoconductive element via a compressible contacting region, wherein during a printing fluid transfer the compressible contacting region is compressed against the photoconductive drum. In an example, the transfer distance may be a distance within a range from −1 to 0 mm with respect to the compressible contacting region, wherein the negative values of the range result in a compression of the contacting portion of the developing unit. However, when not considering the thickness of the compressible contacting region, the transfer distance may be a distance within a range from 1 to 6 mm.

To obtain the printing fluid profile on the surface of the photoconductive element, each of the first predetermined distance, the second predetermined distance, and the transfer distance (or distances, when using a plurality of developing units) have to be within their respective ranges. In addition, to avoid print quality issues on the resulting printing fluid profile, the distances have to remain as uniform as possible while the printing fluid profile is being generated. In an example, positioning a photoconductive element at different distances relative to a charging element during printing operations may result in a faulty charging operation which may lead to an inadequate transfer of printing fluid to the surface of the photoconductive element. Similarly, positioning a photoconductive element at different distances relative to a discharging element during printing operations may result in a faulty discharging operation which may lead to an inadequate transfer of printing fluid to the surface of the photoconductive element. Consequently, due to the printing fluids are selectively transferred based on electrical charge differences, a deficient photoconductive element charge will lead to the generation of a faulty printing fluid profile. In other examples, a faulty position of the developing unit will result in an inadequate transfer of printing fluid which may lead to a faulty printing fluid profile.

Among other, print quality issues resulting from non-uniform positioning during the generation of a printing fluid profile comprise blurred images, printing fluid transfer errors, non-uniform colors on the printing fluid profile, and directional banding.

According to an example, a photoconductive element may be in the form of a photoconductive drum rotatable about a photoconductive drum support. To generate the printing fluid profile on the photoconductive drum, the developing unit(s), the charging element(s), and the discharging element(s) may be positioned at a respective distance with respect to the photoconductive drum. In some examples, while the support rotates, each of the charging element(s), the discharging element(s), and the developing unit(s) may be at non-uniform distances with respect to the photoconductive drum as a result of a wrong photoconductive drum alignment with respect to the support. Therefore, as a result of the wrong alignment, the image transfer to the substrate may include print quality issues.

According to other examples, a photoconductive drum may be removed from the support when maintenance operations are to be performed or when a different photoconductive drum is to be used. When subsequently inserting a photoconductive drum (either the same or a different one), the photoconductive drum may be deficiently aligned with respect to the support. Therefore, considering the frequency in which a photoconductive drum is removed and subsequently inserted on the shaft, the alignment of the photoconductive drum with respect to the support is one of the factors which lead to the appearance of print quality issues.

Disclosed herein are examples of supports, printing systems, and methods to mitigate the negative impacts resulting from a wrong alignment of a photoconductive drum with respect to a photoconductive drum support.

Referring now to FIG. 1A, a schematic drawing illustrating a side view of a photoconductive drum support 100 is shown. The photoconductive drum support 100 may be used to hold a photoconductive drum in place and to have the photoconductive drum accurately aligned. The photoconductive drum support 100 comprises a receiving body 110 positioned to receive a photoconductive drum, a rear cup 120 coupled to a first end 112*a* of the receiving body 110, a locking member 130, and a front cup 140 comprising an aperture (not visible in FIG. 1A) to receive the locking member 130 and a projecting portion 115 of the receiving body 110.

In FIG. 1A, the locking member 130 is rotatably coupled to the projecting portion 115 via a locking member pivot 131. The locking member 130 is movable between an unlocked position in which the front cup 140 is movable along the projecting portion 115 and a locked position. To contact a second end 112*b* of the receiving body 110, the front cup 140 is positioned on the projecting portion 115 with the aperture of the front cup 120 aligned with respect to the projecting portion 115 and the locking member 130. Otherwise, a contact between the front cup 140 and one of the projecting portion 115 and the locking member 130 prevents the front cup 140 from being positioned on the projecting portion 115. Then, once the front cup 140 is positioned on the projecting portion 115, a movement of the locking member 130 from the unlocked position to the locked position fixes the front cup 140 and the rear cup 120 at a predetermined distance. The predetermined distance, in some examples, may be associated with a length of the photoconductive drum to be received on the receiving body 110.

In some examples, the rear cup 120 is coupled to the first end 112*a* of the receiving body 110 via fixing members such as fasteners. In this way, a relative position of the rear cup 120 and the receiving body 110 may be fixed. Examples of fasteners comprise pins, screws, rivets, adhesive, or other types of suitable fasteners.

In some other examples, to obtain a repeatable positional and angular alignment between the front cup 140 and the second end 112*b* of the receiving body 110 when fixing a position of the front cup 140 with respect to the rear cup 120, alignment members may be used. Due to the contact surface between the front cup 140 and the second end 112*b* of the receiving body 110 may be irregular, a positional and angular orientation reduces the chances of a wrong position and alignment of the front cup 140 with respect to the receiving body 110. In an example, the second end 112*b* of the receiving body 110 comprises a plurality of alignment elements and the front cup 140 comprises a plurality of complementary alignment elements associated with the alignment elements of the receiving body 110. As a result, in the locked position of the locking member 130, the plurality of alignment elements of the receiving body 110 is inserted into the plurality of complementary alignment elements of the front cup 140 such that the front cup 140 is oriented with respect to the receiving body 110. In turn, when aligning the front cup 140 to the receiving body 110, the front cup 140 is oriented with respect to the rear cup 120. Examples of alignment members comprise leading pins and protruding elements and examples of complementary alignment members comprise guiding tracks, apertures, and indentations. In some examples, kinematic or quasi-kinematic coupling may be used to obtain a proper alignment of the front cup 140 with respect to the receiving body 110 of the support 100.

Figure 1B:
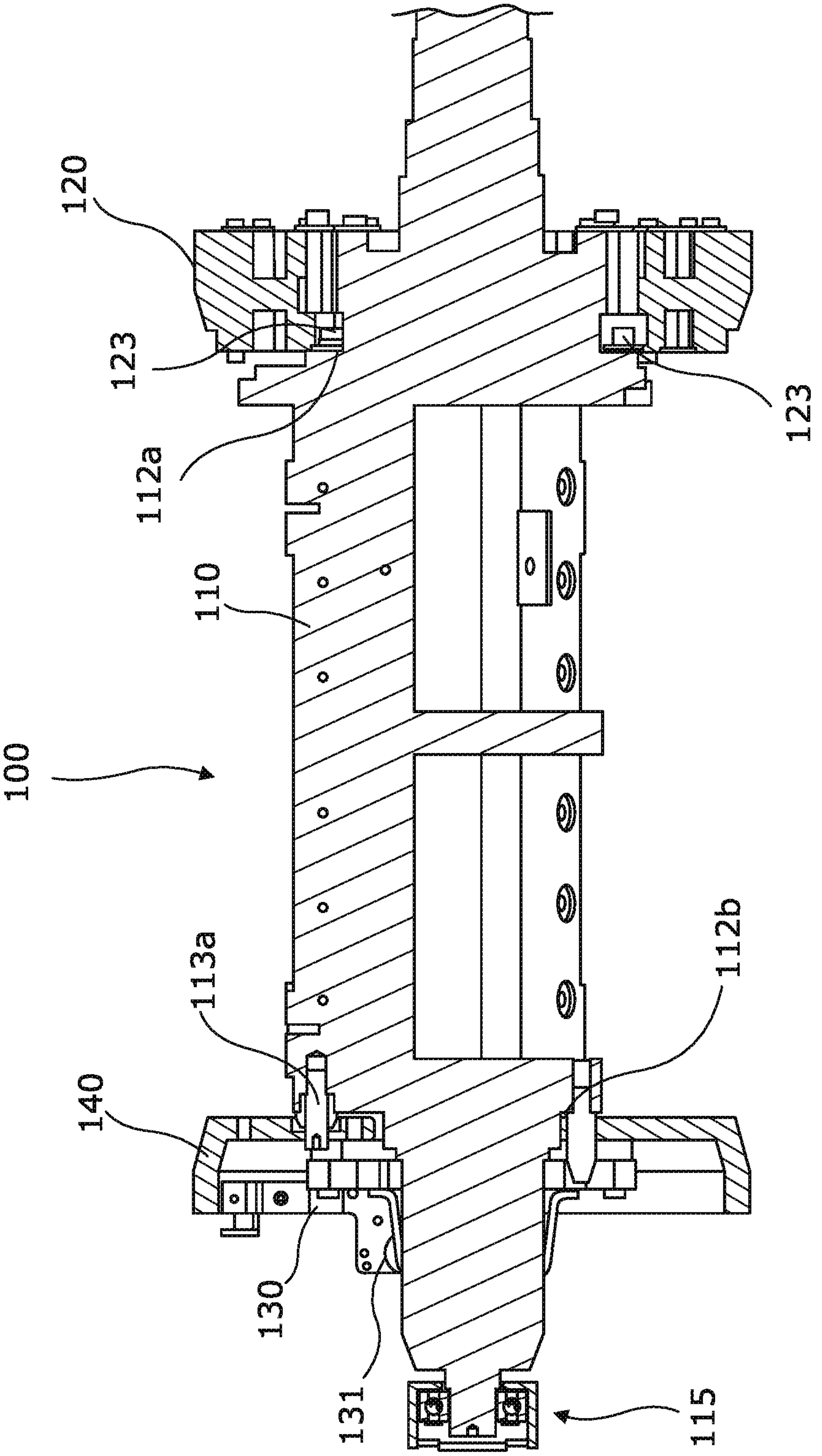
FIG. 1B shows a schematic drawing illustrating a cross-sectional view of the photoconductive drum support of FIG. 1A with the locking member in the locking position.

Referring now to FIG. 1B, a schematic drawing illustrating a cross-sectional view of the photoconductive drum support 100 with the locking member in the locked position is shown. In the locked position, the locking member 130 fixes the front cup 140 with respect to the rear cup 120 at a predetermined distance. As previously explained, the locking member 130 is rotatable about the locking member pivot 131. During a movement of the locking member 130 from the unlocked positioned (represented in FIG. 1A) towards the locked position (represented in FIG. 1B), the locking member 130 contacts with the front cup 140 positioned on the projecting portion 115 of the receiving body 110. As a result of the contact, the front cup 140 moves towards the receiving body 110 and the rear cup 120. Then, in the locked position, the locking member 130 is positioned to fix the front cup 140 and the rear cup 120 at the predetermined distance. In an example, the predetermined distance may be considered from a face of the front cup 140 facing the receiving body 110 to a face of the rear cup 120 facing the receiving body 110.

In the support 100 represented in FIG. 1B, the rear cup 120 is mechanically coupled to a first end 112*a* of the receiving body via intermediate elements 123. In an example, the intermediate elements 123 may be distributed along a contact surface resulting from a contact of the receiving body 110 with the rear cup 120. In some examples, the intermediate elements 123 may correspond to fixing members such as fasteners. However, in some other examples, the intermediate elements 123 may correspond to biasing members capable of recovering size and shape after a deformation such as a linear spring or non-linear springs. When using biasing members elements as intermediate elements 123, the rear cup 120 may move as a result of a contact between the rear cup 120 and the photoconductive drum. In this fashion, damages on the photoconductive drum resulting from a sudden movement may be reduced. In some other examples, the use of biasing members as intermediate elements 123 compensates tolerances of the photoconductive drum. In this way, photoconductive drums having a length within a tolerance length range may be held in place by the front cup 140 and the rear cup 120.

As previously explained in FIG. 1A, alignment elements may be used to align the front cup 140 with respect to the receiving body 110. In FIG. 1B, the receiving body 110 comprises a first alignment element 113*a* and the front cup 140 comprises a complementary alignment member to receive the first alignment element 113*a*. Hence, upon the front cup 140 is positioned to contact a second end 112*b* of the receiving body 110, and the locking member 130 is moved to the locked position, the first alignment element 113 and the complementary alignment element of the front cup 140 will orient the front cup 140 with respect the receiving body 110 and the rear cup 120.

Although in FIG. 1B the support 100 comprises the first alignment element 113*a*, in other examples, the support 100 may comprise additional or fewer alignment elements.

In some examples, the locking member 130 may comprise a latch member such as a spring latch to fix the locking member in the locking position. In this way, the locking member will be reliable fixed, and therefore, movements of the locking member 130 from the locked position to the unlocked position during a printing operation are prevented. In an example, the locking member pivot 131 may comprise the latch member to prevent the locking member from rotating with respect to the projecting portion 115. In an example, the latch member may be a spring loaded cam-based system.

Figure 2A:
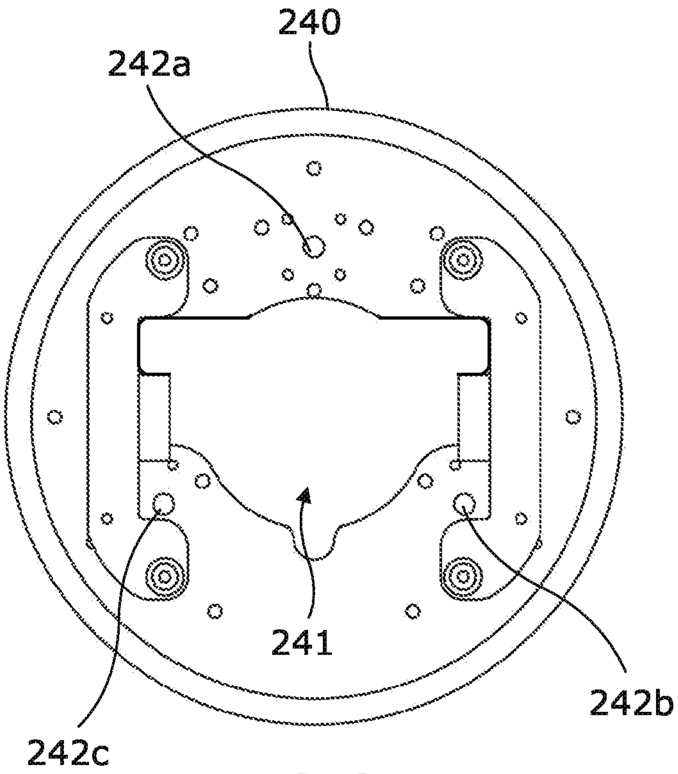
FIG. 2A shows a schematic drawing illustrating a front view of a front cup of a photoconductive drum support, according to an example of the present disclosure.

Referring now to FIG. 2A, a schematic drawing illustrating a front view of a front cup 240 is shown. The front cup 240, as previously explained, comprises an aperture 241 to receive a locking member and a projecting portion of a receiving body of the photoconductive drum support. In use, the front cup 240 is positioned to contact a second end of the receiving body. In addition to the aperture 241, the front cup 240 comprises a first alignment aperture 242*a*, a second alignment aperture 242*b*, and a third alignment aperture 242*c*.

In some examples, the aperture 241 may be shaped in accordance with a preferred position of the locking member such that the front cup 240 prevents the insertion of the locking member if the position of the locking member is different than the preferred position. In an example, the preferred position may be the unlocking position of the locking member. Thus, if the locking member is in the locked position, a contact between the front cup 240 and the locking member prevents the aperture 241 from receiving the locking member. In addition, when the aperture 241 is shaped in accordance with a preferred position of the locking member, the front cup 140 and the receiving body of the support are repeatably oriented every time that the front cup is positioned on the projecting portion.

As previously explained, the alignment apertures of the front cup 240 enable to align the front cup 240 with respect to a receiving body of the photoconductive drum support. Due to a contact surface between the front cup 240 and the receiving body of the support may be irregular, the use of alignment apertures orients the front cup 240 with respect to the support. In turn, the alignment apertures fix a position of the front cup with respect to other elements of the support.

Figure 2B:
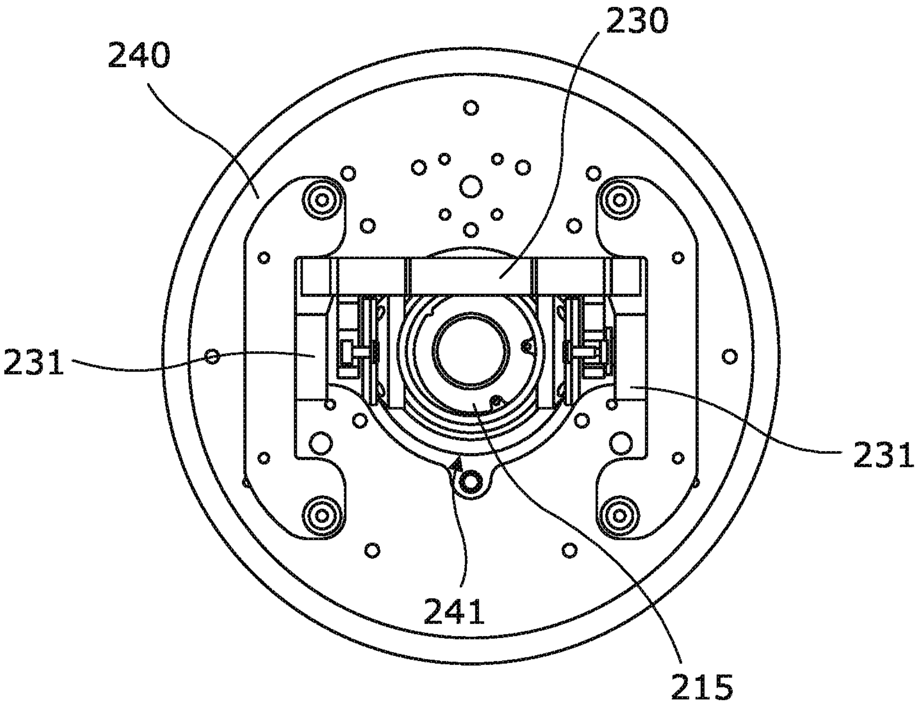
FIG. 2B shows a schematic drawing illustrating a front view of a photoconductive drum support comprising the front cup of FIG. 2A.

Referring now to FIG. 2B, a schematic drawing illustrating a front view of a photoconductive drum support 200 using the front cup 240 of FIG. 2A is shown. The photoconductive drum support 200 comprises a receiving body including a projecting portion 215, a rear cup (not shown in FIG. 2B), a locking member 230 rotatable about a locking member pivot 231, and the front cup 240. The locking member 230 is movable between an unlocked position in which the front cup 240 is movable along the projecting portion 215 of the receiving body, and a locked position in which the locking member 230 fixes the front cup 240 at a predetermined distance with respect to the rear cup.

To ensure an accurate orientation of the front cup 240 with respect to the receiving body, the front cup 240 of the photoconductive drum support 200 comprises the aperture 241. In particular, as previously explained in FIG. 2A, the aperture 241 is shaped so as to receive the projecting portion 215 and the locking member 230 in the unlocked position. Therefore, if the locking member 230 is in the locked position, the front cup 240 will prevent the insertion. In addition, the aperture 241 assist a user by indicating how to position the front cup 240 on the receiving portion 215. In this way, users will repeatably position the front cup 240 with respect to the receiving body, and hence, with respect to the rear cup.

As explained above, an orientation of the front cup 240 with respect to the receiving body of the support 200 may be further improved when using alignment members and complementary alignment members. In the support 200, the front cup 240 comprises the first, second and third alignment apertures previously explained in FIG. 2A. In some examples, one of the alignment apertures may be at a different distance so as to ensure that the front cup 240 is accurately positioned with respect to the receiving body of the support 200.

Figure 3:
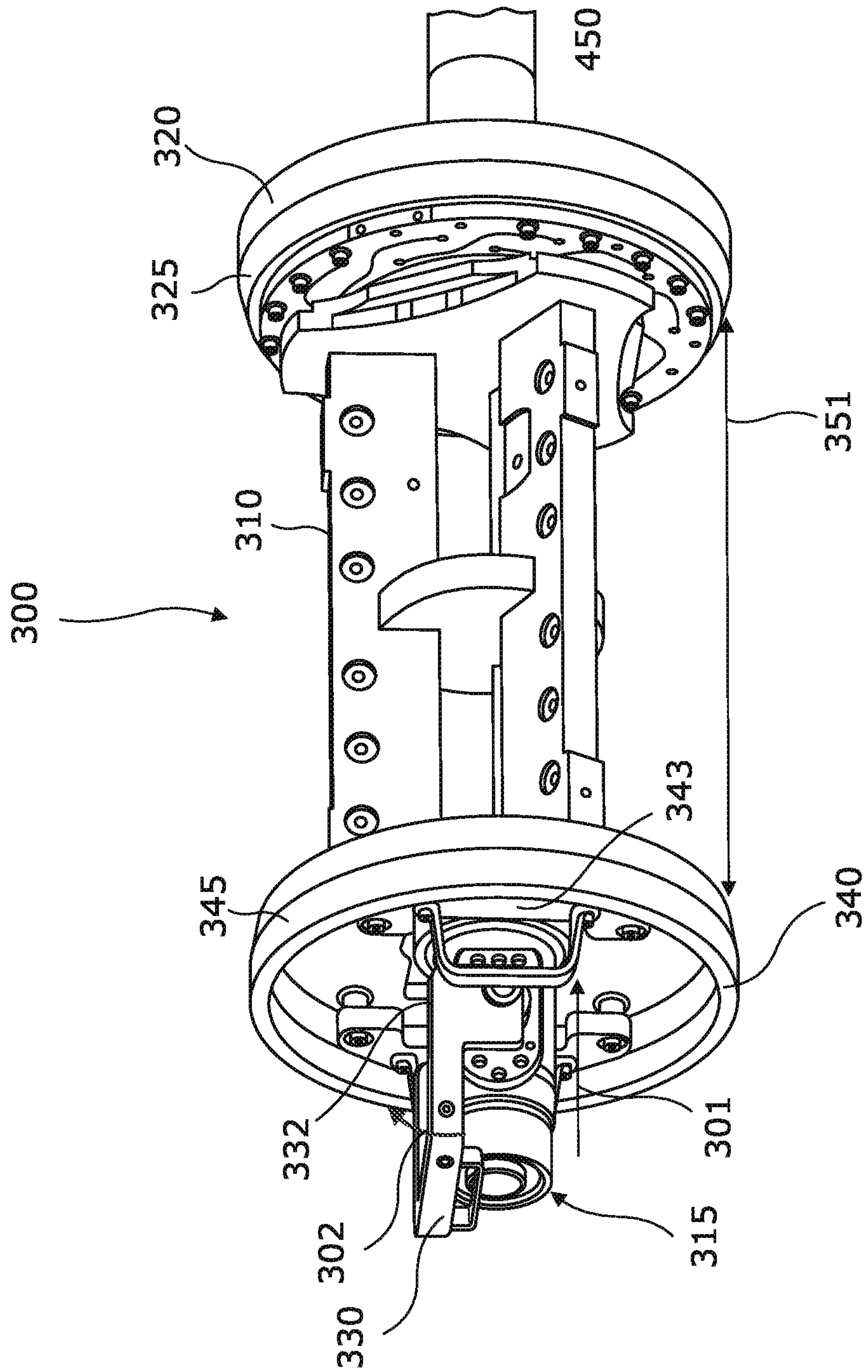
FIG. 3 shows a photoconductive drum support having a locking member 330 in an unlocked position, according to an example of the present disclosure.

Referring now to FIG. 3, a photoconductive drum support 300 having a locking member 330 in an unlocked position is shown. The photoconductive drum support 300 comprises a receiving body 310, a rear cup 320 coupled to the receiving body 310, the locking member 330, and a front cup 340. In the unlocked position of the locking member 330, the locking member 330 is parallel to a projecting portion 315 of the receiving body 310. The locking member 330, as previously explained, is rotatably coupled to the projecting portion 315. In FIG. 3, the locking member 330 comprises a locking member protruding region 332 and the front cup 340 comprises a complementary protruding region 343 including a handle to improve the user experience when positioning the front cup 340 on the projecting portion 315. However, in other examples, the complementary protruding region 343 may not include the handle.

To receive the locking member 330 and the projecting portion 315, the front cup 340 comprises an aperture. To insert the front cup 340 on the projecting portion 315 of the support 300, the front cup 340 is moved in the direction indicated by arrow 301 from a free end of the projecting portion 315 towards the receiving body 310. As a result of the movement, the front cup 340 contacts the receiving body 310.

However, in the unlocked position of the locking member 330, the front cup 340 is free to move along the projecting portion 315. Thus, regions of the front cup 340 may be at different distances with respect to the rear cup 320 and the receiving body 310 in the unlocked position of the locking member 330. For example, if the uppermost region of the front cup 340 is tilted towards the receiving body 310, the uppermost portion of a lateral surface 345 of the front cup 340 is closer to a lateral surface 325 of the rear cup 320 than a lowermost portion of the lateral surface 345 of the front cup 340. To effectively fix the position of the front cup 340 and the rear cup 320, the locking member 330 is rotated towards a locked position in the direction indicated by arrow 302. In this way, the protruding region 332 of the locking member 330 contacts with the complementary protruding region 343 thereby moving the front cup 340 towards the receiving body 310. Then, in the locked position of the locking member 330, the front cup 340 is fixed at a predetermine distance 351 with respect to the rear cup 320. In some examples, the predetermined distance 351 may correspond to a length of a photoconductive drum to be received on the receiving body 310.

In FIG. 3, the lateral surface 345 of the front cup 340 and the lateral surface 325 of the rear cup 320 comprise sloped regions. In particular, the lateral surface 345 comprises a first flange positioned to receive a first end of the photoconductive drum and the lateral surface 325 comprises a second flange positioned to receive a second end of the photoconductive drum. Accordingly, to match with the shape of the lateral surfaces, each of the first end and the second end of the photoinductive drum may correspond to each of the first flange and the second flange. In this way, when the photoconductive drum is received on the receiving body 310, the forces transmitted from the front cup 340 to the photoconductive drum via the first flange will align the photoconductive with respect to the receiving body 310, thereby aligning the first end with respect to front cup 340. Similarly, the forces transmitted from the photoconductive drum to the rear cup 320 via the second flange will align the second end of photoconductive drum with respect to the rear cup 320. In some examples, the first flange and the second flange may be at an angle within a range from 10° to 45° with respect to the receiving body 310, wherein the first flange is sloped towards the receiving body 310 and the second flange is sloped towards the receiving body 310.

In some examples, the front cup 340 and the receiving body 310 of the support 300 may include alignment elements so as to repeatably orient the front cup 340 with respect the receiving body 310. In an example, the front cup 340 may correspond to the front cup 240 previously explained in reference to FIGS. 2A and 2B.

In other examples, the front cup 340 may be coupled to the front cup via a plurality of biasing members distributed along the complementary protruding region 343. As a result, the forces resulting from the contact between the locking member 330 and the front cup 340 will be uniformly transmitted towards the front cup 340. In some other examples, the complementary protruding region 343 may comprise an indentation in which the protruding region 332 of the locking member 330 is locked in the locked position of the locking member 330. In this way, the position of the locking member 330 is fixed, and therefore, the front cup 340 and the rear cup 320 are kept at the predetermined distance 351. However, in other examples, the locking member 330 may further comprise a latch member such as a spring latch to prevent the locking member 330 from moving to the unlocked position during a printing operation.

According to some examples, support arms may be used to support the loads of the photoconductive drum support such as the weight of the support and external forces applied to the support by external elements (such as the developing units, charging elements, cleaning stations, or transfer elements). In an example, a front support arm may be coupled to the projecting portion of the receiving body. However, since the photoconductive drum (and the front cup as well) is loaded on the projecting portion via a free end of the projecting portion, the front support arm may be movable between an engaged position and a disengaged position. In the engaged position, the front arm is coupled to the projecting portion of the support thereby preventing the front cup (and the photoconductive drum, if loaded) from being removed from the support. On the other hand, in the disengaged position, the front support arm rests away from the projecting portion such that the front cup (and the photoconductive drum, if any) can be inserted to (and removed from) the support.

Figure 4:
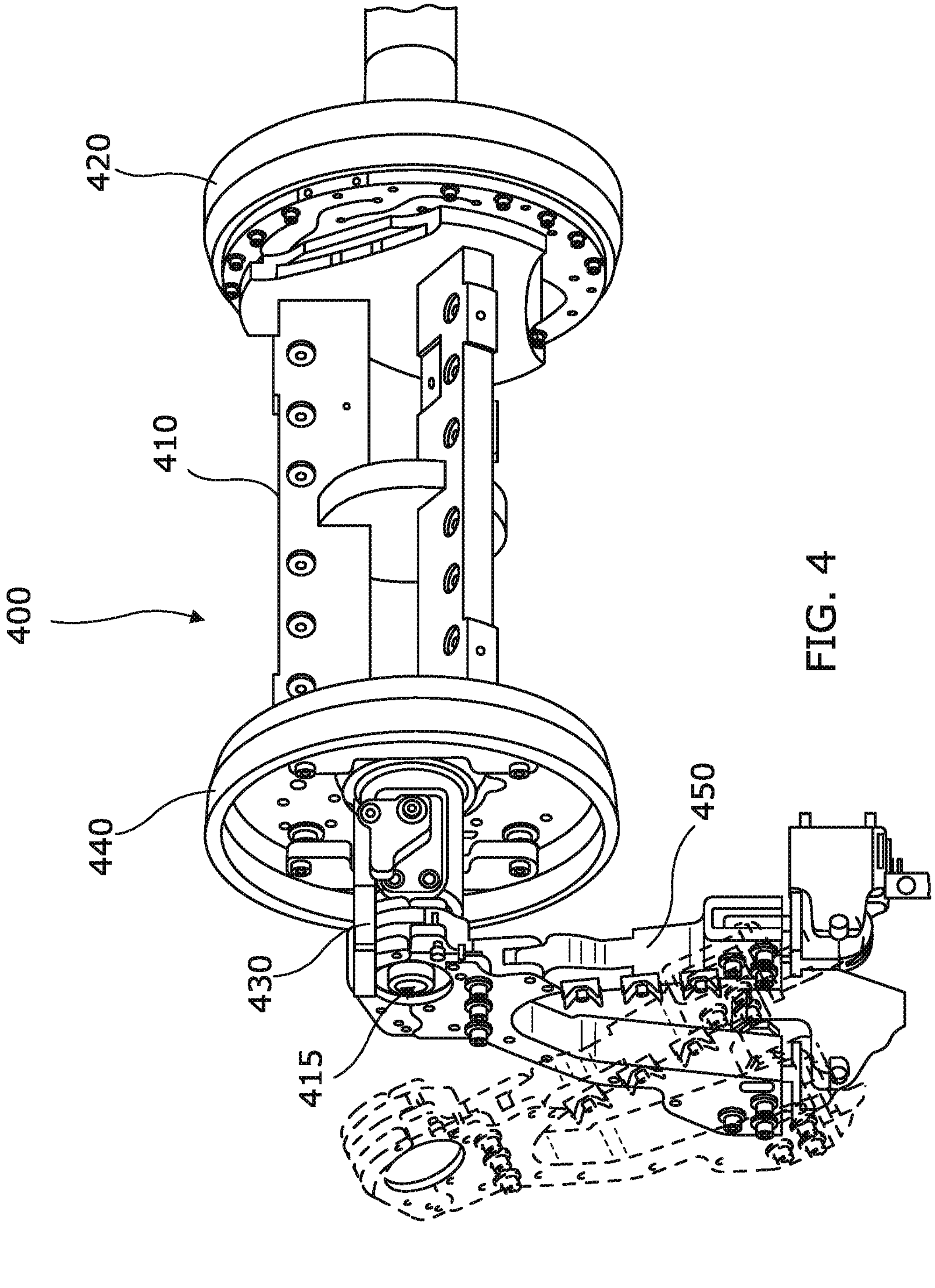
FIG. 4 shows a front support arm and a photoconductive drum support, according to an example of the present disclosure.

Referring now to FIG. 4, a front support arm 450 coupled to a photoconductive drum support 400 is shown. The photoconductive drum support 400 comprises a receiving body 410, a rear cup 420 coupled to a first end of the receiving body 410, a locking member 430 in an unlocked position, and a front cup 440. As previously explained, in the unlocked position, the front cup 440 is movable along the projecting portion 415 of the receiving body 410. The front support arm 450 is movable between an engaged position in which the support arm 450 is coupled to a projecting portion 415 of the support 400 and a disengaged position (represented in dashed lines) in which the front support arm 450 is away from the projecting portion 415. In the engaged position, the front support arm 450 alleviates the forces and the torques received by the receiving body 410 of the support 400. In addition, the front support arm 450 further increases the security of the photoconductive support 400, as further detailed below.

In the engaged position of the front support arm 450, the front support arm 450 prevents the front cup 440 from being removed. Therefore, to load a photoconductive drum on the receiving body 410 or to remove the front cup 440 from the projecting portion 415, the front support art 450 has to be in the disengaged position. In the disengaged position, the front cup 440 of the photoconductive drum support 400 can be removed from the projecting portion 415. Then, once the front cup 440 is positioned back on the projecting portion, the front support arm 450 is moved back to the engaged position.

In FIG. 4, the front support arm 450 is coupled to a distal end of the projecting portion 415 via a clamping element 451. To improve the user experience, the clamping element 451 may be fastened and unfastened without using additional tools. In an example, the distal end of the projecting portion 415 of the receiving body 410 may comprise a bearing to reduce the friction forces resulting from a rotation of the support 400.

In an example, a status of the locking member 430 and the front support arm 450 may associated with a position of each of the locking member 430 and the front support arm 450. For instance, the position of each of the elements may be associated with a safe-to-go status referring to a configuration in which the photoconductive drum support 400 and the front support arm 450 are ready to perform a maintenance operation or a printing operation. For instance, in the example of FIG. 4, a safe-to-go status may be determined when the front support arm 450 is in the engaged position, the locking member 430 is in the locked position, and the front cup 440 is present. Otherwise, the status of the elements may be associated with a non-safe-to-go status. In the present case, the status of the example of FIG. 4 is the non-safe-to-go status. To obtain the safe-to-go status, the locking member 430 has to move to the locking position in which the front cup 440 is fixed at the predetermined distance with respect to the rear cup 420.

In some examples, a sensor may determine a safe-to-go status based on a presence of the front cup 440, a position of the locking member 430, and a position of the front support arm 450. In an example, the sensor may determine a first contact between the front support arm 450 and the projecting portion 415 of the support 400, and a second contact between the locking member 430 and the front cup 440. Therefore, if the sensor determines that the first contact and the second contact are occurring, the safe-to-go status is determined. In other examples, a sensor may be used for determining a position of the locking member 430 and a presence of the front cup 440.

In some other examples, additional sensors to determine a presence of a photoconductive drum may be used. In this way, during the checks preceding a printing operation, a safe-to-print status may be determined based on the safe-to-go status and the presence of the photoconductive drum. In an example, a printing system may restrict some of its functionalities based on the safe-to-print status.

Figure 5:
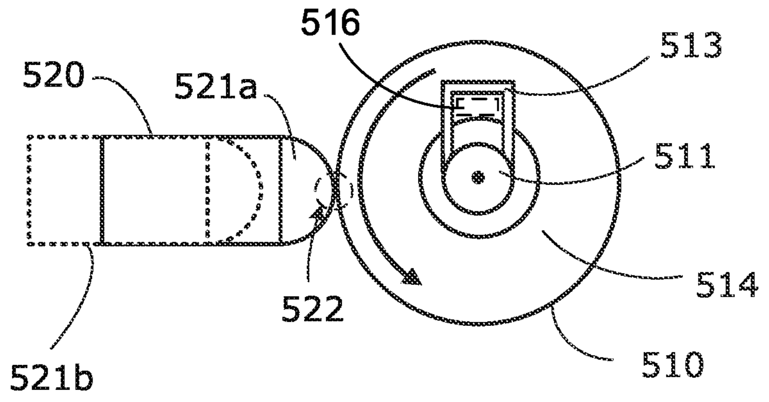
FIG. 5 shows a printing system comprising a photoconductive drum support and a developing unit, according to an example of the present disclosure.

Referring now to FIG. 5, a printing system 500 comprising a photoconductive drum support 510 and a developing unit 520 is shown. The printing system 500, which may correspond to an LEP printing system, may be used to generate a printing fluid profile on a photoconductive drum (not shown in FIG. 5). The photoconductive drum support 510 of the printing system 500 comprises a rotatable body including a projecting portion 511, a rear cup, a locking member 513, and a front cup 514. As previously explained, the rotatable body is positioned to receive a photoconductive drum. The front cup 514 comprises an aperture positioned to receive the projecting portion 511 and the locking member 513. In an example, the photoconductive drum support 510 may correspond to the supports 100, 200, 300, and 400 previously explained in reference to FIGS. 1 to 4.

In use, the developing unit 520 of the printing system 500 may selectively transfer printing fluid to a surface of a photoconductive drum loaded on the support 510. To transfer the printing fluid, the developing unit 520 is movable towards the rotatable body. In FIG. 5, an engaged position 521*a* is represented in solid lines and a disengaged position 521*b* is represented in dashed lines. In the engaged position 521*a*, a tip of the developing unit 520 is at a transfer distance 522 with respect to the surface of the loaded photoconductive drum. However, when the photoconductive drum is not loaded, the tip of developing unit in the engaged position is at a distance with respect to the rotatable body.

The locking member 513 of the support 510 is movable between a locked state and an unlocked state. In the unlocked state, the locking member 513 is away from the front cup 514 and in the locked state, the locking member 513 contacts the front cup 514. As a result of the contact between the locking member 513 and the front cup 514, the front cup 514 is fixed at a predetermined distance with respect to the rear cup. In some examples, the locked state corresponds to the locked position and the unlocked state corresponds to the unlocked position previously explained in reference to other examples.

To determine a position of the locking member 513, the printing system 500 comprises a sensor 516 located in the front cup 514. However, alternative locations for the sensor 516 may be possible, such as on a surface of the front cup 514, the locking member 513, or other elements of the printing system 500. In FIG. 5, the sensor 516 may be used for determining a position of the elements of the support 510 based on a position of the locking member 513 and a presence of the front cup 514. To determine the position of the locking member 513 and the presence of the front cup 514, the sensor 516 may determine how far is a distal end of the locking member 513 with respect to the sensor 516. In an example, the distal end of the locking member 513 may comprise a RFID tag detectable by the sensor 516.

In an example, the printing system 500 may further comprise a photoconductive drum loaded on the rotatable body of the support 510. Thus, in the locked state of the locking member 513, the photoconductive drum is held in place between the front cup 514 and the rear cup such that, when the developing unit 520 moves towards the photoconductive drum to the engaged position 521*a*, a transfer distance 522 is substantially uniform as the support 510 rotates (and hence, as the photoconductive drum rotates).

As previously explained, non-uniform transfer distances may result in print quality issues. Therefore, when the developing unit 520 is moved to the engaged position 521*a*, the transfer distance 522 has to be as uniform as possible. In an example, when using alignment elements on the front cup 514 and the rotatable body, the relative location between the sub-elements of the support 510 (for instance, the front cup 514 with respect to the rotatable body) may be reliably fixed in a repeatable manner. In other examples, each of the front cup 514 and the rear cup may comprise flanges to receive both ends of the photoconductive drum. In some other examples, the rear cup may be coupled to the rotatable body via biasing members such that forces transmitted from the photoconductive drum to the rear cup are uniformly distributed. Similarly, the rear cup of the support 510 may be fixed to the rotatably body via biasing elements such that tolerances in the length of the photoconductive drum may be compensated.

In some other examples, the printing system 500 may further comprise additional elements such as charging elements and discharging elements. As previously explained, a wrong position of these elements with respect to the photoconductive drum may lead to print quality issues. Hence, when using the photoconductive drum support 510 to hold a photoconductive drum in place, the photoconductive drum and at least one of the charging element and the discharging element are kept at a uniform distance as the support 510 rotates.

Although not represented in FIG. 5, it should be appreciated that the printing system may comprise additional developing units. In an example, the printing system comprises a set of developing units and the photoconductive drum support, wherein the photoconductive drum support is to receive a photoconductive drum such that the transfer distances between the developing units and the photoconductive drum are uniform as the photoconductive drum support rotates.

In further examples, the printing system 500 may further comprise a front support arm movable between an engaged position in which the front support arm is coupled to the projecting portion 515 of the photoconductive drum support 510 and a disengaged position in which the front support arm is away from the projecting portion 515. In an example, the sensor 516 of the printing system 500 may be used for determining a safe-to-go status. The safe-to-go status, as previously explained in FIG. 4, may be determined based on a position of the front support arm, a position of the locking member 513, and a presence of the front cup 514. For instance, to determine the positions of the locking member 513 and the front support arm by using the sensor 516, each of a distal end of the locking member 513 and a distal end of the front support arm may include RFID tags. Upon the sensor 516 determines that the front support arm is in the engaged position, the locking member 513 is in the locked position, and the front cup 514 is present, the sensor 516 issues a safe-to-go signal associated with a safe-to-to status. In other examples, the printing system 500 may further comprise a second sensor to determine a presence of a photoconductive drum on the rotatable body, wherein the second sensor issues a safe-to-print signal associated with a safe-to-print status based on the safe-to-go-status and the presence of the photoconductive drum.

According to some examples, locking methods may be performed using the photoconductive drum supports previously explained. Such locking methods may accurately position and align a front cup with respect to a rear cup (and a receiving body of the support) in a repeatable manner. In addition, locking methods using the aforementioned photoconductive drum supports fix the front cup with respect to the rear cup in a reliable and safe way without using additional tools (e.g., screwdrivers or wrenches).

Figure 6:
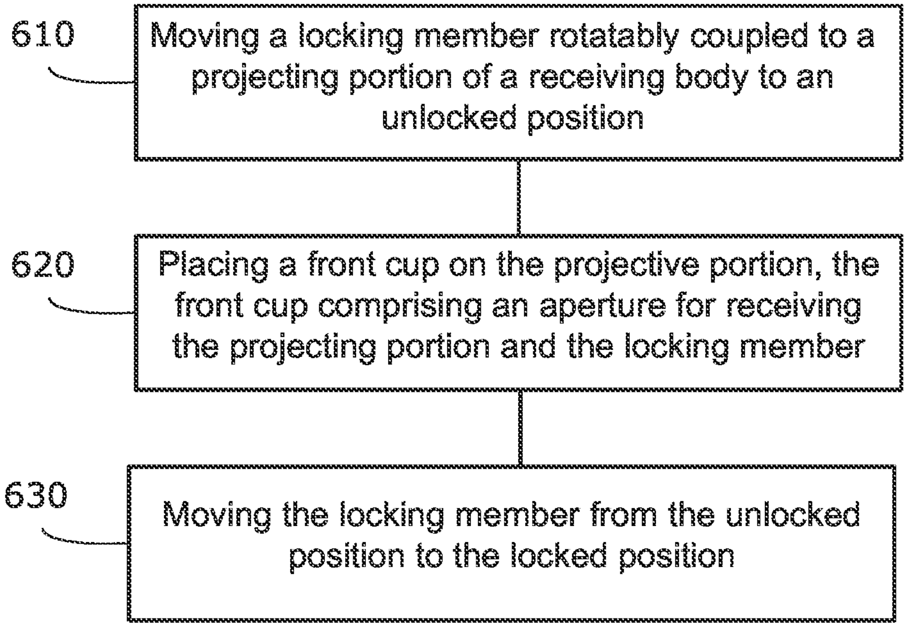
FIG. 6 shows a method for positioning a front cup and a rear cup at a predetermined position, according to an example of the present disclosure.

Referring now to FIG. 6, a method 600 for positioning a front cup and a rear cup at a predetermined distance is shown. The predetermined distance may be, for instance, a distance associated with a length of a photoconductive drum to be loaded on a photoconductive drum support. At block 610, method 600 comprises moving a locking member rotatably coupled to a projecting portion of a receiving body to an unlocked position. The unlocked position may correspond, for instance, to the position of the locking members 130, 230, 330, and 430 previously explained in FIGS. 1A, 2B, 3, and 4. At block 620, method 600 comprises placing a front cup on the projective portion, the front cup comprising an aperture for receiving the projecting portion and the locking member. In some examples, the aperture of the front cup may be shaped to receive the locking member in a particular position such as the unlocked position. In this way, users will place the front cup with respect to the receiving body in a particular orientation. At block 630, method 600 comprises moving the locking member from the unlocked position to the locked position. As a result of the movement from the unlocked position to the locked position, the front cup moves towards a first end of the receiving body. In the locked position, the front cup is fixed at a predetermined distance with respect to a rear cup coupled to a second end of the receiving body. As explained above, to move the front cup towards the receiving body, the locking member contacts the front cup as the locking member is moving towards the locked position.

In some examples, the locking member is locked in the locked position. In an example, the front cup may comprise an indentation in which a protruding region of the locking member is inserted. In other examples, the locking member may comprise a latch member such as a spring latch to lock the position of the locking member in the locked position. In this way, the safety of the printing operation will be improved.

In other examples, method 600 may further comprise placing a photoconductive drum on the receiving body and the movement of the locking member from the unlocked position to the locked potation (block 630) results in a contact of the front cup with a first end of the photoconductive drum and a contact of rear cup with a second end of the photoconductive drum. As a result of the contacts, each of the ends of the photoconductive drum are aligned with respect to the front cup and the rear cup, and therefore, the photoconductive drum is aligned with respect to the receiving body. In some examples, each of the front cup and the rear cup may comprise sloped regions for receiving the photoconductive drum. When having sloped regions, the photoconductive drum may be accurately aligned with respect to the receiving body. In this way, external elements such as developing units, charging elements, and discharging elements will be accurately positioned with respect to the photoconductive drum.

In some other examples, method 600 may further comprise orienting the front cup with respect to the receiving body. Due to the contact surface between the front cup and the receiving body may be irregular, orienting the front cup with respect to the receiving body reduces the chance of a wrong positioning between the front cup and the rear cup. In an example, the front cup may comprise a plurality of apertures and the first end of the receiving body comprises a plurality of protruding elements, and method 600 may further comprise rotating the front cup about the projecting portion to an aligned angular position in which the plurality of apertures matches the plurality of protruding elements. Then, the movement of the locking member from the unlocked position to the locked position orients the front cup with respect to the receiving body.

In some other examples, a front support arm may be used to support the projecting portion of the receiving body. In an example, method 600 further comprises moving the front support arm to an engaged position in which the front support arm is coupled to the projecting portion of the receiving body and determining a safe-to-go status based on a position of the locking member and a position of the front support arm. As previously explained in reference to FIG. 4, the positions of each of the locking member and the front support arm may be determined via a sensor(s). In other examples, an additional sensor may be used to determine a presence of a photoconductive drum on the receiving body. In an example, a safe-to-print status may be determined based on the safe-to-go status and the presence of the photoconductive drum on the receiving body. In this way, a user may know if the printing system is ready based on the position of the locking member, the position of the front support arm, and the presence of the photoconductive drum on the receiving body. In an example, a printing system may restrict some of its functionalities based on at least one of the safe-to-print status and the safe-to-go status.

What has been described and illustrated herein are examples of the disclosure along with some variations. The terms, descriptions, and figures used herein are set forth by way of illustration only and are not meant as limitations. Many variations are possible within the scope of the disclosure, which is intended to be defined by the following claims (and their equivalents) in which all terms are meant in their broadest reasonable sense unless otherwise indicated.

What is claimed is:

1. A photoconductive drum support comprising:

a receiving body positioned to receive a photoconductive drum, the receiving body comprising a projecting portion;

a rear cup coupled to a first end of the receiving body;

a locking member rotatably coupled to the projecting portion; and a front cup positioned to contact a second end of the receiving body, the front cup comprising an aperture to receive the locking member and the projecting portion, wherein the front cup is positioned on the projecting portion, wherein the locking member is movable between an unlocked position in which the front cup is movable along the projecting portion and a locked position in which the locking member is positioned to fix the front cup and the rear cup at a predetermined distance.

2. The support of claim 1, wherein the second end of the body comprises a plurality of alignment elements and the front cup further comprises a plurality of complementary alignment elements, wherein in the locked position of the locking member, the plurality of alignment elements is inserted into the plurality of complementary alignment elements such that the front cup is oriented with respect to the receiving body.

3. The support of claim 1, wherein the aperture comprises an aperture positioned to receive the locking member in the unlocked position, wherein in the locked position, a contact between the front cup and the locking member prevents the aperture of the front cup from receiving the locking member.

4. The support of claim 1, wherein:

a lateral surface of the front cup includes a first flange positioned to receive a first end of the photoconductive drum, and a lateral surface of the rear cup includes a second flange positioned to receive a second end of the photoconductive drum.

5. The support of claim 1, wherein:

the locking member includes a protruding region, the front cup includes a complementary protruding region, and in the locked position of the locking member, the protruding region contacts the complementary protruding region of the front cup.

6. A method comprising:

moving a locking member rotatably coupled to a projecting portion of a receiving body to an unlocked position;

placing a front cup on the projecting portion, the front cup comprising an aperture for receiving the projecting portion and the locking member; and moving the locking member from the unlocked position to a locked position, wherein the movement from the unlocked position to the locked position moves the front cup towards a first end of the receiving body, wherein in the locked position, the front cup is fixed at a predetermine distance with respect to a rear cup coupled to a second end of the receiving body.

7. The method of claim 6, further comprising:

placing a photoconductive drum on the receiving body, wherein the movement of the locking member from the unlocked position to the locked position results in contact of the front cup with a first end of the photoconductive drum and contact of the rear cup with a second end of the photoconductive drum.

8. The method of claim 6, further comprising:

moving a front support arm to an engaged position in which the front support arm is coupled to the projecting portion; and determining a safe-to-go status based on a position of the locking member, a position of the front support arm, and a presence of the front cup.

9. The method of claim 6, wherein the front cup comprises a plurality of apertures and the first end of the receiving body comprises a plurality of protruding elements, the method further comprising:

rotating the front cup about the projecting portion to an aligned angular position in which the plurality of apertures matches the plurality of protruding elements, wherein the movement of the locking member from the unlocked position to the locked position orients the front cup with respect to the receiving body.

10. A printing system comprising:

a photoconductive drum support comprising:

a rotatable body positioned to receive a photoconductive drum, wherein the body comprises a projecting portion, a locking member rotatably coupled to the projecting portion, a rear cup coupled to a first end of the body, and a front cup positioned to contact a second end of the body, the front cup comprising an aperture positioned to receive the locking member and the projecting portion; and a developing unit movable towards the rotatable body, wherein the locking member is movable between an unlocked state in which the locking member is away from the front cup and a locked state in which the locking member contacts the front cup such that the front cup is fixed at a predetermined distance with respect to the rear cup.

11. The printing system of claim 10, wherein the photoconductive drum support further comprises:

a photoconductive drum on the body, wherein in the locked state of the locking member, the photoconductive drum is held in place between the front cup and the rear cup such that when the developing unit moves towards the photoconductive drum to an engaged position, a distance from the developing unit to the photoconductive drum is substantially uniform as the support rotates.

12. The printing system of claim 10, further comprising:

a front support arm movable between an engaged position in which the support arm is coupled to the projecting portion and a disengaged position in which the support arm is away from the projecting portion, wherein in the unlocked state of the locking member, the locking member prevents the support arm from coupling to the projecting portion.

13. The printing system of claim 12, further comprising a sensor to determine a position of the front support arm, a position of the locking member, and a presence of the front cup, wherein upon the sensor determines that the front support arm is in the engaged position, the locking member is in the locked position, and the front cup is present, the sensor issues a safe-to-go signal associated with a safe-to-go status.

14. The printing system of claim 10, wherein the front cup further comprises a plurality of apertures and the second end of the body further comprises a plurality of leading pins positioned to receive the plurality of apertures, wherein in the locked state, the plurality of leading pins is in the plurality of apertures.

* * * * *